United States Patent
Davidson et al.

(10) Patent No.: US 10,125,901 B2
(45) Date of Patent: Nov. 13, 2018

(54) SPRAYER HOSE ASSEMBLY

(71) Applicant: Delta Faucet Company, Indianapolis, IN (US)

(72) Inventors: Kyle Robert Davidson, Noblesville, IN (US); Graeme Biagi, Reno, NV (US); Orion Vazquez, Reno, NV (US)

(73) Assignee: Delta Faucet Company, Indianapolis, IN (US)

( * ) Notice: Subject to any disclaimer, the term of this patent is extended or adjusted under 35 U.S.C. 154(b) by 7 days.

(21) Appl. No.: 14/967,249

(22) Filed: Dec. 11, 2015

(65) Prior Publication Data

US 2016/0169421 A1 Jun. 16, 2016

Related U.S. Application Data

(60) Provisional application No. 62/090,985, filed on Dec. 12, 2014.

(51) Int. Cl.
| | | |
|---|---|---|
| *F16L 55/00* | (2006.01) | |
| *F16L 11/10* | (2006.01) | |
| *B29D 23/00* | (2006.01) | |
| *E03C 1/02* | (2006.01) | |

(52) U.S. Cl.
CPC .............. *F16L 11/10* (2013.01); *B29D 23/00* (2013.01); *E03C 1/025* (2013.01)

(58) Field of Classification Search
CPC ....... G01M 3/18; F16L 11/127; F16L 33/2071
USPC ............ 138/123–127, 109; 73/763; 340/604, 340/605; 4/623
See application file for complete search history.

(56) References Cited

U.S. PATENT DOCUMENTS

| | | | | |
|---|---|---|---|---|
| 4,229,613 A | * | 10/1980 | Braun | B29D 23/001 138/103 |
| 4,259,991 A | * | 4/1981 | Kutnyak | B29C 47/0023 138/125 |
| 4,402,095 A | | 9/1983 | Pepper | |
| 4,589,688 A | | 5/1986 | Johnson | |
| 4,654,096 A | * | 3/1987 | Jant | B29D 23/001 156/149 |
| 4,668,319 A | | 5/1987 | Piccoli | |
| 5,024,419 A | | 6/1991 | Mulvey | |
| 5,969,618 A | * | 10/1999 | Redmond | G01M 3/18 174/11 R |
| 6,006,784 A | | 12/1999 | Tsutsui et al. | |
| 6,029,293 A | | 2/2000 | Paterson et al. | |
| 6,106,027 A | | 8/2000 | Mulvey et al. | |

(Continued)

FOREIGN PATENT DOCUMENTS

| | | |
|---|---|---|
| CN | 201462232 U | 5/2010 |
| EP | 2511435 A1 | 10/2012 |

(Continued)

OTHER PUBLICATIONS

WO 2014/143918 A2, Alfred Nelson et al., Sep. 18, 2014.*

*Primary Examiner* — Patrick F Brinson
(74) *Attorney, Agent, or Firm* — Faegre Baker Daniels LLP

(57) ABSTRACT

A sprayer hose for a fluid delivery device includes a waterway tube having an outer surface. The sprayer hose further includes at least one energy wire extending helically around the outer surface of the waterway tube and a covering layer positioned outwardly of the waterway tube and the at least one energy wire.

20 Claims, 8 Drawing Sheets

(56) References Cited

U.S. PATENT DOCUMENTS

| | | | |
|---|---|---|---|
| 6,386,237 B1 * | 5/2002 | Chevalier | F16L 11/12 116/208 |
| 6,636,686 B1 | 10/2003 | Belfer | |
| 6,915,817 B2 | 7/2005 | Benstead et al. | |
| 7,464,418 B2 | 12/2008 | Seggio et al. | |
| 7,467,874 B2 | 12/2008 | Gautschi et al. | |
| 7,555,936 B2 * | 7/2009 | Deckard | F16L 11/127 138/104 |
| 7,631,372 B2 | 12/2009 | Marty et al. | |
| 8,087,430 B1 * | 1/2012 | Betz | F16L 11/12 138/104 |
| 8,118,240 B2 | 2/2012 | Rodenbeck et al. | |
| 8,291,939 B2 * | 10/2012 | Ferrone | A01K 7/027 138/104 |
| 2003/0111126 A1 * | 6/2003 | Moulton | A47L 9/24 138/122 |
| 2003/0183294 A1 * | 10/2003 | Carlson | A61M 16/08 138/129 |
| 2007/0239155 A1 | 10/2007 | Ibrahim et al. | |
| 2007/0246564 A1 | 10/2007 | Rodenbeck et al. | |
| 2008/0006337 A1 * | 1/2008 | Quigley | F16L 9/19 138/125 |
| 2008/0178957 A1 | 7/2008 | Thomas et al. | |
| 2009/0126820 A1 | 5/2009 | Thomas et al. | |
| 2009/0179165 A1 | 7/2009 | Parsons et al. | |
| 2010/0044604 A1 | 2/2010 | Burke et al. | |
| 2011/0253220 A1 | 10/2011 | Sawaski et al. | |
| 2012/0160349 A1 | 6/2012 | Jonte et al. | |
| 2012/0234409 A1 | 9/2012 | Klicpera | |
| 2014/0246099 A1 | 9/2014 | Herbert | |
| 2016/0025246 A1 * | 1/2016 | Nelson | F16L 11/10 285/8 |

FOREIGN PATENT DOCUMENTS

| | | |
|---|---|---|
| WO | WO2013098546 A1 | 7/2013 |
| WO | WO2014143918 | 9/2014 |
| WO | WO 2014143918 A2 * | 9/2014 |

* cited by examiner

SPRAYER HOSE ASSEMBLY

CROSS-REFERENCE TO RELATED APPLICATION

The present application claims priority to U.S. Provisional Patent Application Ser. No. 62/090,985, filed Dec. 12, 2014, the disclosure of which is expressly incorporated by reference herein. This application is related to U.S. Provisional Patent Application Ser. No. 61/791,227, filed on Mar. 15, 2013, and entitled "SPRAYER HOSE ASSEMBLY", and International Patent Application No. PCT/US14/28097, filed on Mar. 14, 2014, and entitled "SPRAYER HOSE ASSEMBLY", the complete disclosures of which are expressly incorporated by reference herein.

BACKGROUND AND SUMMARY OF THE INVENTION

The present invention generally relates a sprayer hose assembly, and more particularly, to a method of forming a sprayer hose assembly.

Faucet assemblies may include a base, handle, and spout for delivering fluid therefrom. One embodiment of a faucet may include a pull-down sprayhead and a sprayer hose. The pull-down sprayhead is configured to be separated from the spout and extend therefrom. More particularly, the sprayer hose may be coupled to the sprayhead and configured to be positioned within the spout in a first or docked position of the sprayhead and extend outwardly from the spout in a second or pull-down position of the sprayhead.

Various embodiments of faucet assemblies may include at least one electronic device for controlling certain parameters of the faucet assembly. For example, the faucet assembly may include an electronic user interface, an electrical solenoid valve, electrical sensors for determining temperature and/or pressure of the fluid, and electrical wires and a controller for controlling the features of the faucet assembly, including the delivery mode (e.g., spray, stream).

According to an illustrative embodiment of the present disclosure, a sprayer hose for a fluid delivery device includes a waterway tube having an outer surface. The sprayer hose further comprises at least one energy wire extending helically around the outer surface of the waterway tube and a covering layer positioned outwardly of the waterway tube and the at least one energy wire.

According to another illustrative embodiment of the present disclosure, a method of forming a sprayer hose for a fluid delivery device comprises providing a waterway tube, positioning at least one energy wire around an outer surface of the waterway tube in a helical configuration, and positioning a covering layer around the waterway tube and the at least one energy wire.

According to yet another illustrative embodiment of the present disclosure, a method of forming a sprayer hose for a fluid delivery device comprises providing a waterway tube including a first portion and a second portion positioned axially adjacent the first portion, helically applying at least one energy wire along the first portion of the waterway tube, positioning a portion of the at least one energy wire outward of the waterway tube in a loop at an interface point between the first and second portions of the waterway tube, and helically applying the at least one energy wire along the second portion of the waterway tube.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional types of fluids may be used.

Figure 1:
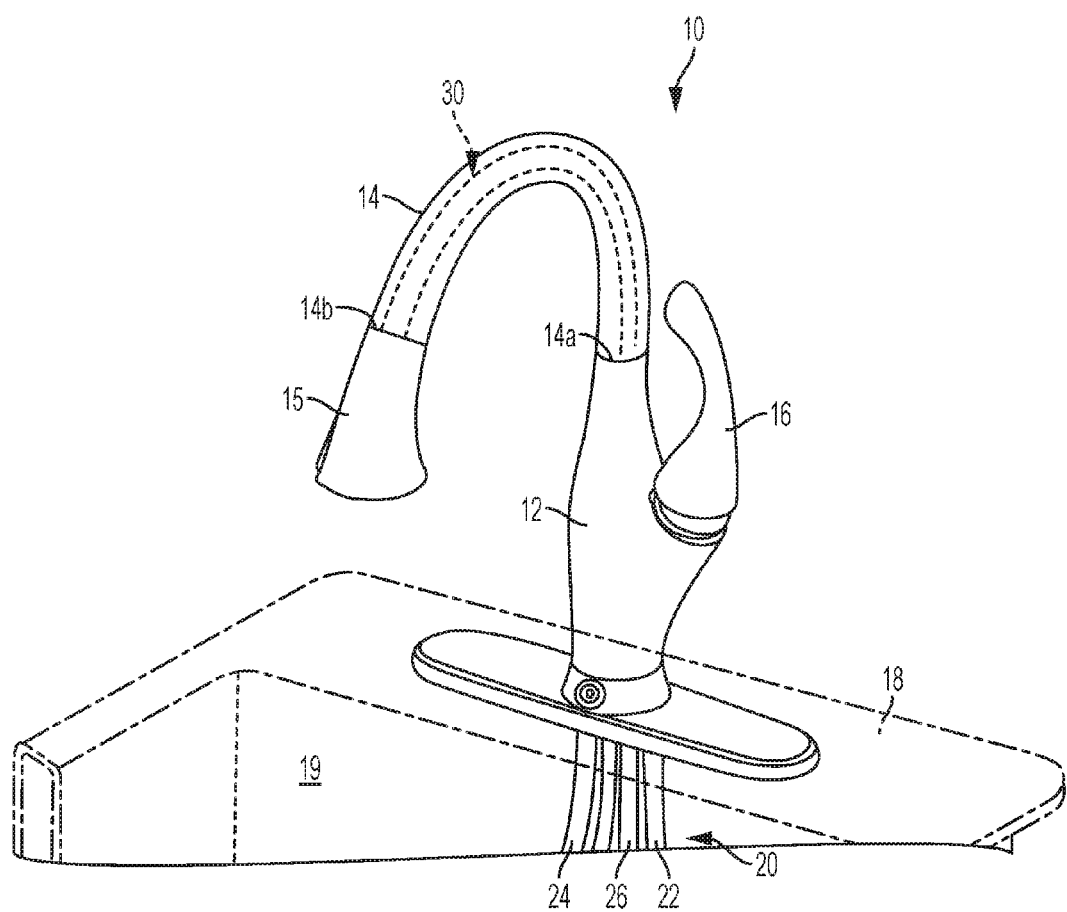
FIG. 1 is a perspective view of an illustrative embodiment fluid delivery device of the present disclosure.

Referring to FIG. 1, an illustrative embodiment fluid delivery device, such as a faucet 10, is shown including a hub 12, a spout 14, a sprayhead 15, at least one handle 16, a waterway assembly 20, and a sprayer hose assembly 30. In operation, faucet 10 receives water from hot and/or cold water supplies (not shown) and may mix the incoming water to form an outlet stream. Faucet 10 may be mounted to a sink deck 18 or another suitable surface and may deliver the outlet stream into a sink basin 19, for example.

The illustrative hub 12 of faucet 10 is a generally hollow component operably coupled to handle 16 and is configured to rest against sink deck 18 or other suitable surface. The top end of hub 12 is configured to mate with spout 14. For example, a first end 14a of spout 14 may be threadably coupled to hub 12.

Hub 12 of faucet 10 may be formed of a traditional metallic material, such as zinc or brass. It is also within the scope of the present disclosure that hub 12 may be formed of a non-metallic material, such as a polymer, illustratively a cross-linkable polymer. Suitable non-metallic materials that may be used to construct hub 12 include cross-linkable polyethylene (PEX), polybutylene terephthalate (PBT), polyester, melamine, melamine urea, and melamine phenolic.

With continued reference to FIG. 1, the illustrative waterway assembly 20 of faucet 10 includes a hot water inlet tube 22, a cold water inlet tube 24, and an outlet tube 26. Hot and cold water inlet tubes 22, 24 may be fluidly coupled to hot and cold water supplies (not shown), respectively, for receiving water into faucet 10. Outlet tube 26 of waterway assembly 20 may be fluidly coupled to sprayer hose assembly 30 for delivering water through spout 14 and from sprayhead 15 of faucet 10.

To limit contact between the water in faucet 10 and metallic components, waterway assembly 20 may be formed of a flexible, non-metallic material, such as a polymer, illustratively a cross-linkable polymer. As such, waterway assembly 20 is illustratively electrically non-conductive. In one illustrative embodiment, substantially the entire waterway assembly 20 is formed of a polyethylene which is subsequently cross-linked to form cross-linked polyethylene (PEX). Other suitable materials that may be used to construct waterway assembly 20 include polyethylene (PE) (such as raised temperature resistant polyethylene (PE-RT)), polypropylene (PP) (such as polypropylene random (PPR)), and polybutylene (PB). It is further envisioned that waterway assembly 20 may be constructed of cross-linked polyvinyl chloride (PVCX) using silane free radical initiators, cross-linked polyurethane, or cross-linked propylene (XLPP) using peroxide or silane free radical initiators. It is within the scope of the present disclosure that the polymer material used to construct waterway assembly 20 may include reinforcing members, such as glass fibers.

Spout 14 of faucet 10 is removably coupled to sprayhead 15. More particularly, sprayhead 15 is configured to move between a first, or docked, position in which sprayhead 15 is coupled to a second end 14b of spout 14 (FIG. 1) and a second, or pull-down, position in which sprayhead 15 is spaced apart from second end 14b of spout 14 which allows a user to direct the flow of fluid from sprayhead 15 in multiple directions.

Sprayer hose assembly 30 is a waterway assembly for spout 14 and sprayhead 15. More particularly, sprayer hose assembly 30 is received within spout 14 and is fluidly coupled to both outlet tube 26 and sprayhead 15 to deliver fluid from faucet 10. In one embodiment, when sprayhead 15 is in the first position, sprayer hose assembly 30 is generally contained within spout 14 and sprayhead 15 is docked or coupled to second end 14b of spout 14. However, when sprayhead 15 is in the second position, a portion of sprayer hose assembly 30 extends outwardly from second end 14b of spout 14 such that sprayhead 15 is spaced apart from second end 14b of spout 14.

Figure 2:
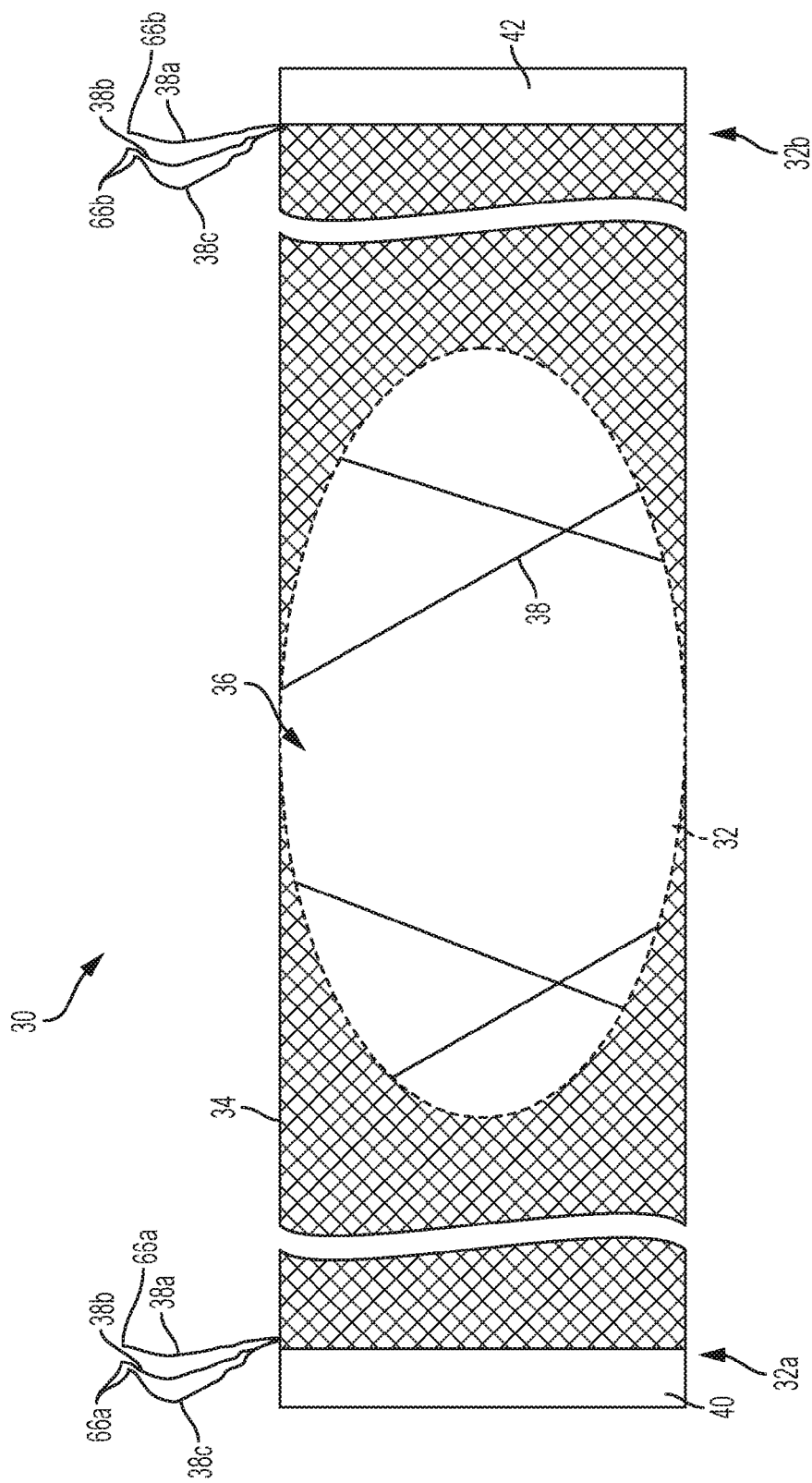
FIG. 2 is a side elevational view of a sprayer hose of the fluid delivery device of FIG. 1 with a covering layer, illustrating a cut-out portion of the covering layer to expose the sprayer hose and energy wires.

Referring to FIG. 2, illustrative sprayer hose assembly 30 includes a waterway tube or hose 32, a protective outer covering or sleeve 34 concentrically and coaxially positioned around an outer surface 36 of waterway tube 32, and at least one energy wire or conduit 38 positioned intermediate outer surface 36 of waterway tube 32 and covering 34.

Illustrative waterway tube 32 has a generally tubular or cylindrical shape which generally defines a circle in cross-section. Waterway tube 32 also has a predetermined length extending between a first end 32a and a second end 32b. The length of waterway tube 32 is based on the length of spout 14 and the desired position of sprayhead 15 when fully extended in the second position.

Waterway tube 32 is fluidly coupled to outlet tube 26 in order to deliver fluid from sprayhead 15 of faucet 10. Waterway tube 32 may be comprised of a material other than that of covering 34 and energy wire 38. For example, to limit contact between the water in faucet 10 and metallic components, waterway tube 32 may be formed of a flexible, non-metallic material, such as a polymer, illustratively a cross-linkable polymer. As such, waterway tube 32 is illustratively electrically non-conductive. In one illustrative embodiment, substantially the entire waterway tube 32 is formed of a polyethylene which is subsequently cross-linked to form cross-linked polyethylene (PEX). In a further illustrative embodiment, waterway tube 32 may be comprised of a flexible rubber material. Other suitable materials that may be used to construct waterway tube 32 include polyethylene (PE) (such as raised temperature resistant polyethylene (PE-RT)), polypropylene (PP) (such as polypropylene random (PPR)), and polybutylene (PB). It is further envisioned that waterway tube 32 may be constructed of cross-linked polyvinyl chloride (PVCX) using silane free radical initiators, cross-linked polyurethane, or cross-linked propylene (XLPP) using peroxide or silane free radical initiators. It is within the scope of the present disclosure that the polymer material used to construct waterway tube 32 may include reinforcing members, such as glass fibers.

Figure 3A:
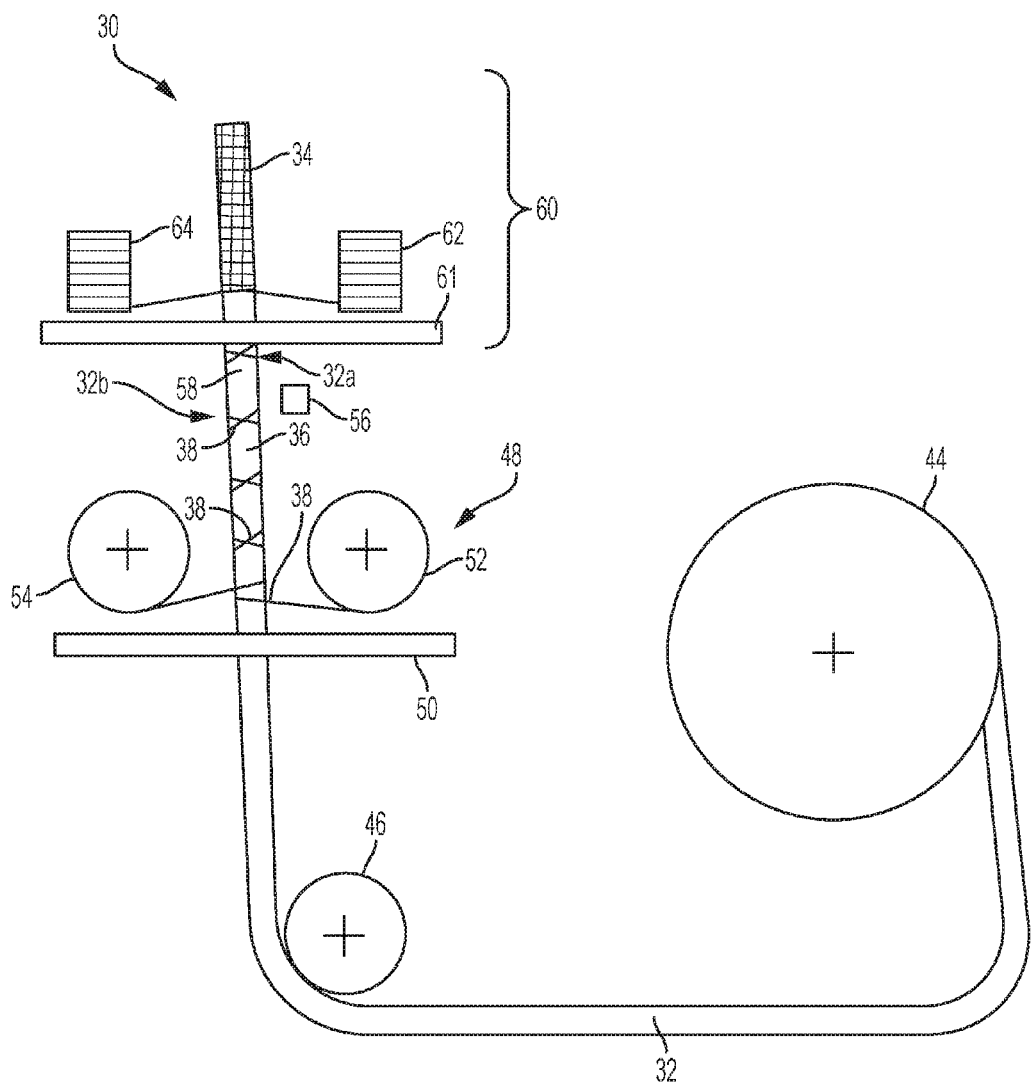
FIG. 3A is a schematic view of an assembly for forming the sprayer hose of FIG. 2.
Figure 3B:
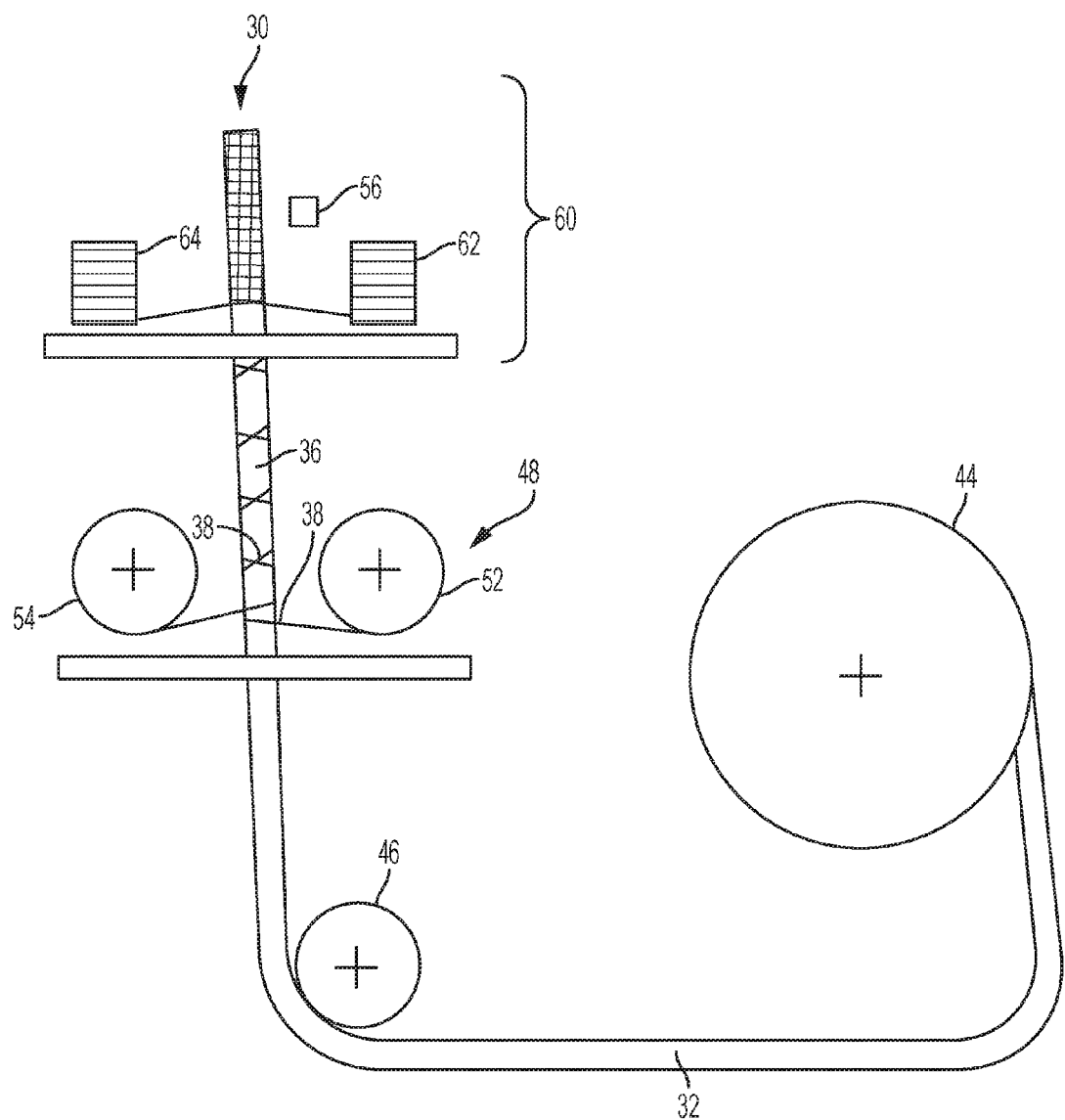
FIG. 3B is a schematic view of an alternative assembly for forming the sprayer hose of FIG. 2.
Figure 4:
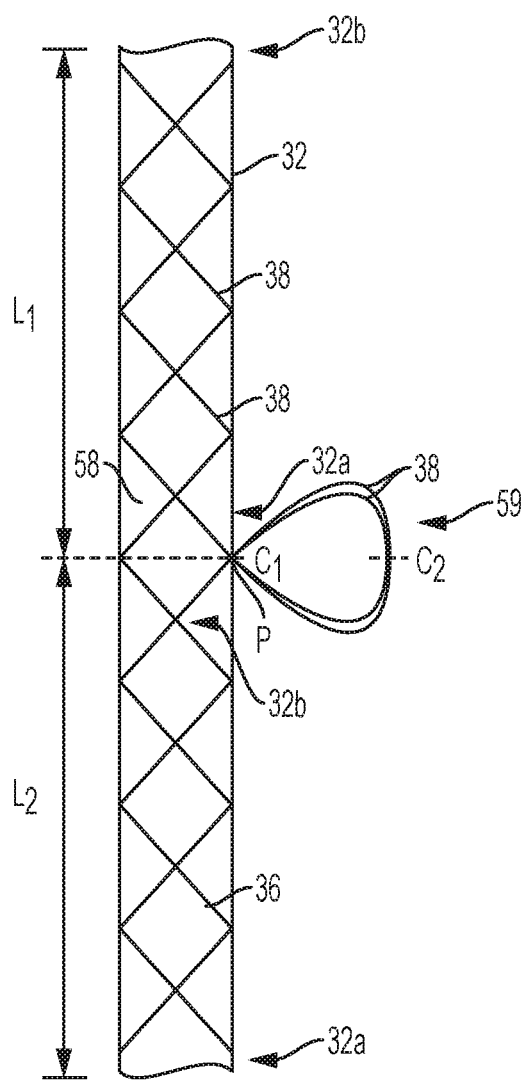
FIG. 4 is a side elevational view of the sprayer hose and energy wires of FIG. 2, illustrating portions of the energy wires pulled away from the waterway tube.

Referring to FIGS. 2-4, the at least one energy wire 38 is positioned around outer surface 36 of waterway tube 32. Illustratively, the at least one energy wire 38 includes three energy wires 38a, 38b, and 38c, however, less or more than three energy wires 38 energy wires 38 may be applied to waterway tube 32 to accommodate specific applications, functions, and features of faucet 10. Energy wire 38 is configured to transmit energy therethrough. For example, in one embodiment, energy wires 38 may be optical fibers or cables configured to transmit light. Alternatively, energy wires 38 may be electrical wires, such as capacitive wires, or any other wires or conduits configured to transmit electrical signals. Illustratively, energy wires 38 are electrically coupled to a controller, sensors (e.g., IR, ultrasonic, capacitive), and/or other electrical components, such as a user interface, of faucet 10. In the illustrative embodiment of the present disclosure, energy wire 38a may be an electrical wire connected to a first sensor (not shown), energy wire 38b may be an electrical wire connected to a second sensor (not shown), and energy wire 38c may be a capacitive wire. In this way, energy wires 38 may be configured to receive a user input or transmit an output signal in order to visually, audibly, or tactilely relay information to and from the user of faucet 10. For example, energy wires 38 may be configured to illuminate a portion of faucet 10 to convey information to a user. Additionally, because energy wires 38 are configured to transmit energy, in the form of electrical signals, light, or other forms of energy, energy wires 38 are isolated from each other by a coating, insulation, or other covering (not shown) which defines the outer surface of energy wires 38.

As shown in FIGS. 2-4, illustrative energy wires 38 are wrapped or wound around outer surface 36 of waterway tube 32 in a helical or spiral configuration. In one embodiment, energy wires 38 are wrapped around waterway tube 32 at a wrap frequency of one complete rotation or revolution of energy wires 38 along every 2 to 4 inches of length of waterway tube 32, and more particularly, every 3 inches of length of waterway tube 32. Alternatively, energy wires 38 may be wrapped around waterway tube 32 at a different wrap frequency or at a specific wrap angle. Illustratively, energy wires 38 may overlap each other at various points along the length of waterway tube 32 due to the helical winding of each energy wire 38.

Because energy wires 38 are helically wrapped around waterway tube 32, the length of each energy wire 38 is greater than the length of waterway tube 32. Furthermore, additional lengths or leads of energy wires 38 extend from waterway tube 32 in order to couple with other components of faucet 10, as shown in FIG. 2.

By applying energy wires 38 in a helical or spiral configuration along the length of waterway tube 32, energy wires 38 are configured to move, bend, and flex with waterway tube 32 without kinking or becoming damaged. As such, the helical configuration allows energy wires 38 to bend and flex in the same configuration as waterway tube 32 but also inhibits permanent work hardening of energy wires 38. Additionally, during manufacture of sprayer hose assembly 30, energy wires 38 may stretch and relax, which also can cause kinks in energy wires 38. However, the helical wrapping of energy wires 38 inhibits kinks therein during the manufacturing process.

Referring to FIGS. 2, 3A, and 3B, covering 34 is positioned around outer surface 36 of waterway tube 32 and energy wires 38 such that energy wires 38 are positioned intermediate outer surface 36 of waterway tube 32 and an inner surface (not shown) of covering 34. Illustrative covering 34 may be a sheath or any other layer defining a cover or outer layer of sprayer hose assembly 30. For example, covering 34 may be an interwoven layer comprised of at least one material other than the material comprising waterway tube 32 and energy wires 38. Illustratively, at least two strands of material are interwoven or braided together in order to define covering 34. In an assembled condition, covering 34 illustratively defines a tubular or cylindrical shape defining a circle in cross-section which is coaxial with waterway tube 32.

As shown in FIG. 2, illustrative sprayer hose assembly 30 further includes a first end cap or annular sleeve 40 adjacent first end 32a of waterway tube 32 and a second end cap or annular sleeve 42 adjacent second end 32b of waterway tube 32. Illustratively, end caps 40, 42 may extend around a portion of an outer surface of covering 34 to crimp or otherwise couple covering 34 to waterway tube 32. Alternatively, in one embodiment, end caps 40, 42 may be overmolded or otherwise coupled directly with first and second ends 32a, 32b, respectively, of waterway tube 32.

Referring still to FIG. 2, energy wires 38 may be positioned adjacent to end caps 40, 42 but are not positioned within any portion thereof. Illustratively, free ends or leads 66a and 66b of energy wires 38 extend outwardly from waterway tube 32 and covering 34 at a position inward of end caps 40 and 42, respectively. As such, energy wires 38 are not crimped or otherwise engaged by end caps 40 and 42, thereby preventing damage to energy wires 38 when end caps 40 and 42 are applied.

Referring to FIGS. 3A-5C, illustrative manufacturing operation for assembling sprayer hose assembly 30 are shown. With reference to FIGS. 3A and 3B, a bulk supply 44 of waterway tube 32 is provided. Illustratively, supply 44 is a spool with a length of bare waterway tube 32. In the illustrative embodiment, supply 44 of waterway tube 32 is configured to rotate to move waterway tube 32 toward additional manufacturing components at a predetermined rate. A guide member 46 also is provided downstream of supply 44 to guide waterway tube 32 toward additional manufacturing components. In one embodiment, waterway tube 32 is pulled by additional manufacturing components which causes supply 44 to rotate. Additionally, guide member 46 may maintain sufficient tension in waterway tube 32 and maintain the rate of movement of waterway tube 32 during manufacture of sprayer hose assembly 30. In one embodiment, guide member 46 may be a friction roller.

Guide member 46 guides waterway tube 32 toward an energy wire assembly 48, which comprises a table 50 and at least one bulk supply of energy wire 38. More particularly, in the illustrative embodiment, energy wire assembly 48 includes at least a first bulk supply 52 of one of energy wires 38a, 38b, 38c and a second bulk supply 54 of another of energy wires 38a, 38b, 38c. Additional supplies of energy wires 38 also may be provided.

As waterway tube 32 passes along table 50 of energy wire assembly 48, supplies 52, 54 may rotate in opposing directions to apply energy wires 38 to waterway tube 32. Additionally, table 50 may rotate at a predetermined rate thereby allowing the individual energy wires 38 to overlap and interweave with each other. As shown in FIGS. 3A, 3B, and 4, energy wires 38 are applied to outer surface 36 of waterway tube 32 in a helical or spiral winding configuration. Illustratively, at least two energy wires 38 are applied to waterway tube 32 and overlap or crisscross each other at various points along the length of waterway tube 32.

The rotation of supplies 52, 54 and table 50 is maintained at a predetermined rate which allows energy wires 38 to be applied to outer surface 36 of waterway tube 32 in a predetermined wrap frequency. For example, in the illustrative embodiment, energy wires 38 are helically applied to outer surface 36 of waterway tube 32 at a wrap frequency of one complete revolution of energy wires 38 about waterway tube 32 per 2 to 4 inches of length of waterway tube 32. Illustratively, energy wires 38 are helically applied to waterway tube 32 at a wrap frequency of one complete revolution of energy wires 38 about waterway tube 32 per 3 inches of length of waterway tube 32. In alternative embodiments, energy wires 38 are applied to waterway tube 32 at different wrap angles or wrap frequencies.

As waterway tube 32 continues through energy wire assembly 48, multiple waterway tubes 32 may be defined, for example, as shown in FIG. 4, a first length $L_1$ of one waterway tube 32 is defined at a cut line $C_1$ and a second length $L_2$ of a second waterway tube 32 also is defined at cut line $C_1$, as discussed further herein. In this way, multiple sprayer hose assemblies 30 are assembled during one manufacturing process. In one embodiment, length $L_1$ of the first sprayer hose assembly 30 is equal to length $L_2$ of the second sprayer hose assembly 30 and may be approximately six feet. However, in alternative embodiments, length $L_1$ of the first sprayer hose assembly 30 may be greater or less than length $L_2$ of the second sprayer hose assembly 30 and greater than or less than six feet. As detailed further herein, each of the individual sprayer hose assemblies 30 are separated from each other, for example by cutting or splicing, at cut line $C_1$. By making a cut or splice at cut line $C_1$, both waterway tube 32 and energy wires 38 are simultaneously cut. As shown in FIG. 4, first end 32a of one waterway tube 32, and a second end 32b of another waterway tube 32 are defined at cut line $C_1$.

Referring further to FIG. 3A, a wire pull member 56 is positioned upstream from energy wire assembly 48 and is configured to contact energy wires 38 at predetermined lengths of waterway tube 32 to remove a portion 59, illustratively a loop, of energy wires 38 from waterway tube 32. More particularly, wire pull member 56 may be a hook or other tool configured to grab and pull a portion of energy wires 38 away from waterway tube 32. Illustratively, portion 59 of energy wires 38 is a loop defined when wire pull member 56 contacts waterway tube 32 at point P (FIGS. 4 and 5A) and pulls portion 59 of energy wires 38 away from waterway tube 32.

Alternatively, as shown in FIG. 3B, wire pull member 56 may be positioned upstream from a covering assembly 60 for applying covering 34 to waterway tube 32, as detailed further herein. As such, wire pull member 56 may enter covering 34 at position P to retrieve portion 59 of energy wires 38 and also exit covering 34 at position P, thereby defining the loop or portion 59, as shown in FIG. 4.

With further reference to FIG. 4, a cut region 58 (that may include no energy wires 38) separates two individual waterway tubes 32 and, more particularly, defines first end 32a for a first length $L_1$ of one waterway tube 32 and defines second end 32b for a second length $L_2$ of a second waterway tube 32, as shown in FIG. 4. In this way, multiple sprayer hose assemblies 30 are assembled during one manufacturing process and the multiple cut regions 58 define a space between each individual sprayer hose assembly 30. In one embodiment, length $L_1$ of the first sprayer hose assembly 30 is equal to length $L_2$ of the second sprayer hose assembly 30 and may be approximately six feet. However, in alternative embodiments, length $L_1$ of the first sprayer hose assembly 30 may be greater or less than length $L_2$ of the second sprayer hose assembly 30. As detailed further below, each of the individual sprayer hose assemblies 30 are separated from each other, for example by cutting or splicing, at a cut line $C_1$ made within each cut region 58.

With further reference to FIGS. 3A and 3B, after waterway tube 32 is wound with energy wires 38, waterway tube 32 continues to move toward covering assembly 60. Illustratively, covering assembly 60 may be a May-Pole Braider. Covering assembly 60 includes at least one bulk supply of a fabric or fiber comprising covering 34. Illustratively, covering assembly 60 includes a first bobbin 62 of fabric or fiber and a second bobbin 64 of fabric or fiber. Bobbins 62, 64 are configured to rotate in opposite directions to interweave the fabrics or fibers together over energy wires 38 and waterway tube 32 to define covering 34. Additionally, in an alternative embodiment, covering assembly 60 may include a table 61 configured to rotate in order to facilitate the interweaving of the fibers. In one embodiment, bobbins 62, 64 are configured to braid various fibers together to define covering 34.

With reference to the illustrative method of manufacturing shown in FIG. 4, covering 34 is applied over outer surface 36 of waterway tube 32 and energy wires 38 in the manner further detailed above. After covering 34 is applied to waterway tube 32, a cutting or slicing step occurs in order to define individual sprayer hose assemblies 30 with predetermined lengths. More particularly, a cut or slice is made along cut lines $C_1$ and $C_2$ to separate individual sprayer hose assemblies 30 and energy wires 38 associated with those sprayer hose assemblies 30.

Figure 5A:
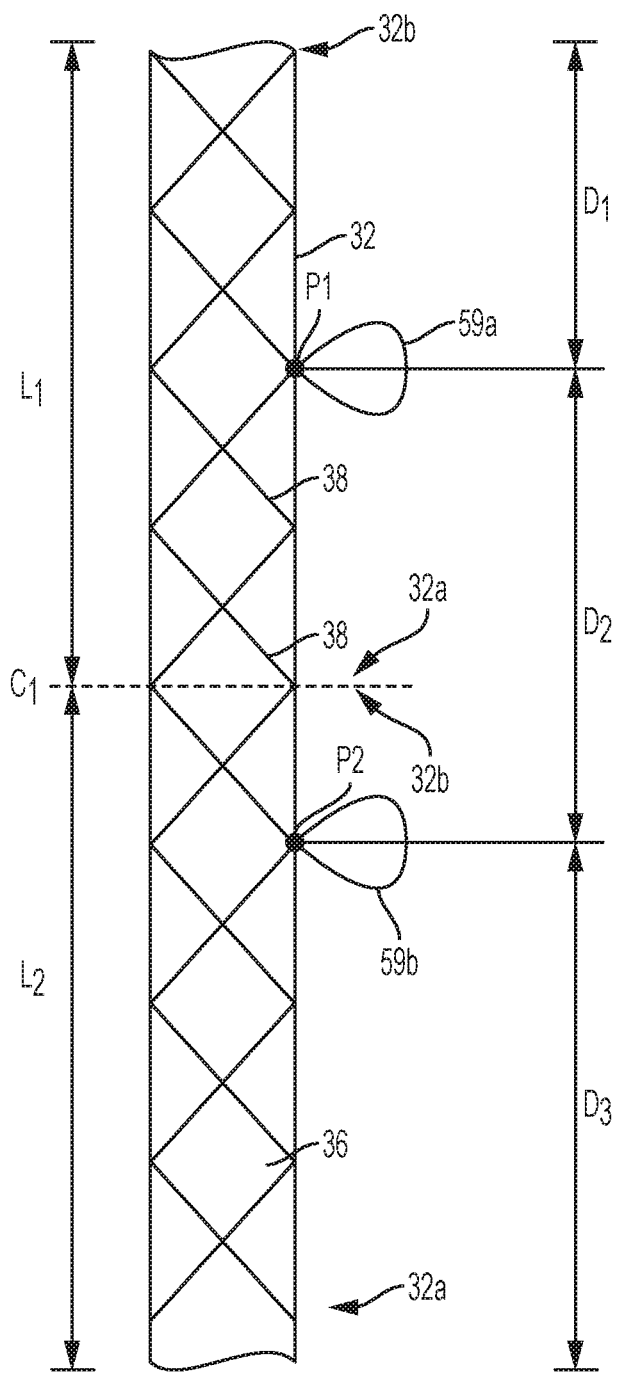
FIG. 5A is a side elevational view similar to FIG. 4, illustrating portions of the energy wires pulled away from the waterway tube at a plurality of locations.
Figure 5B:
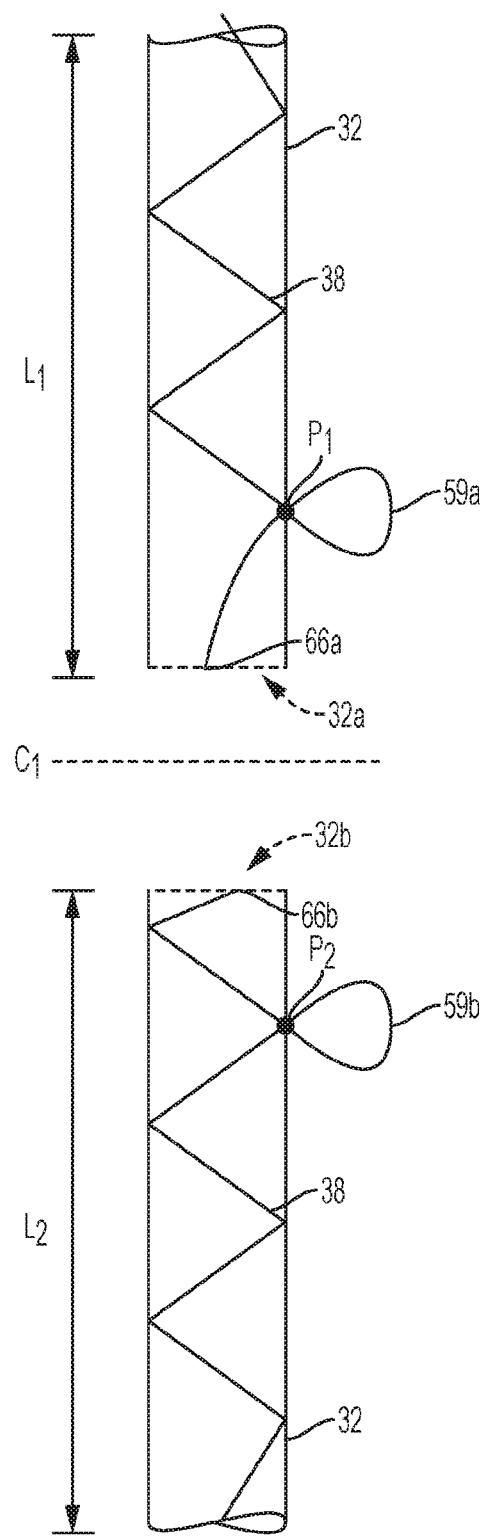
FIGS. 5B and 5C are side elevational views similar to FIG. 5A, illustrating steps in forming leads of the energy wires at ends of the waterway tubes.
Figure 5C:
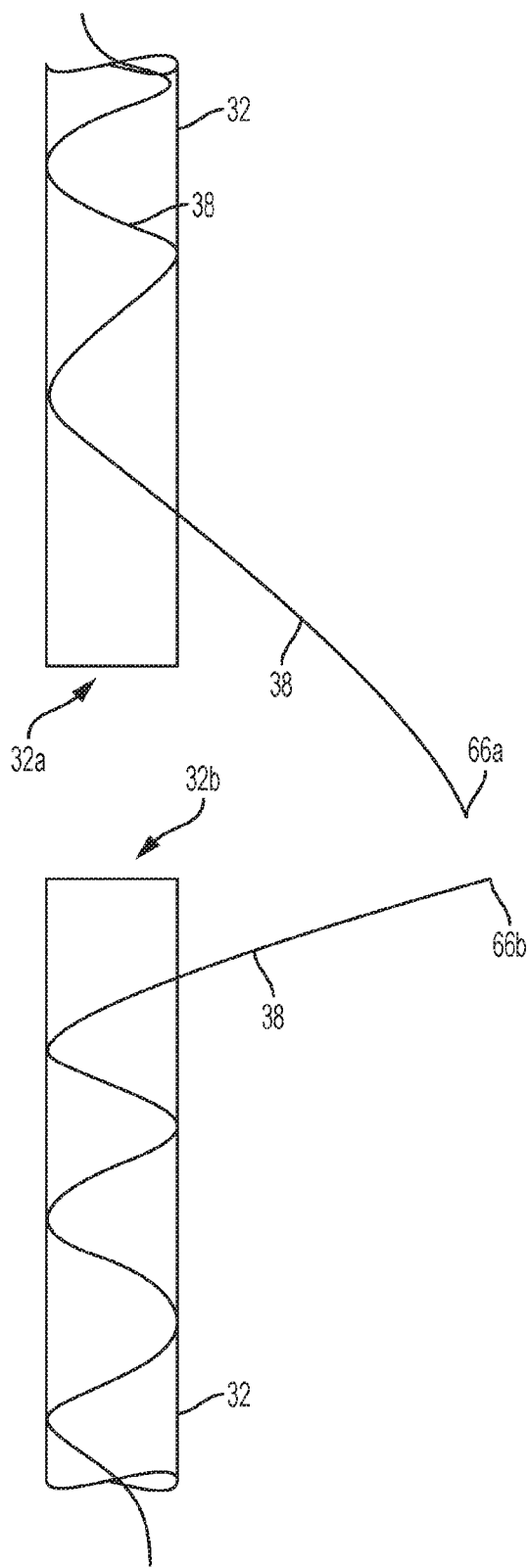

With reference to the alternative method of manufacturing shown in FIGS. 5A-5C, the waterway tube 32 illustratively includes a first portion ($D_1$), a second portion ($D_2$) positioned axially adjacent the first portion ($D_1$), and a third portion ($D_3$) positioned axially adjacent the second portion ($D_2$). The energy wires 38 are helically applied along the first portion ($D_1$) of the waterway tube 32. At an interface point ($P_1$) between the first portion ($D_1$) and the second portion ($D_2$), a portion of the energy wires 38 are pulled outwardly away from the waterway tube 32 to define first loop 59a. Next, the energy wires 38 are helically applied along the second portion ($D_1$) of the waterway tube 32. At an interface point ($P_2$) between the second portion ($D_2$) and the third portion ($D_3$), a portion of the energy wires 38 are pulled outwardly away from the waterway tube 32 to define second loop 59b. Next, the method continues by helically applying energy wires 38 along the third portion ($D_3$) of the waterway tube 32. This method can then be repeated indefinitely.

As shown in FIG. 5B, after covering 34 is applied to waterway tube 32, a cutting or slicing step occurs along cut line $C_1$ in order to define individual sprayer hose assemblies 30 with predetermined lengths ($L_1$ and $L_2$). The ends or leads 66a and 66b of energy wires 38 formed by the cut $C_1$ are then free to be pulled through covering 34 at points $P_1$ and $P_2$ (FIGS. 2, 5B and 5C) and electrically couple with other components of faucet 10 (e.g., sensors, illumination devices, etc.).

Also, because energy wires 38 are now cut at portions or loops 59, energy wires 38 are spaced apart from ends 32a, 32b of waterway tube 32 and do not interfere with applying end caps 40, 42. As such, end caps 40, 42 are subsequently applied to sprayer hose assemblies 30 without crimping energy wires 38 therein. As shown in FIG. 2, leads 66a and 66b of energy wires 38 are spaced apart from first and second ends 32a and 32b of waterway tube 32 and end caps 40 and 42 to prevent damage to energy wires 38 when end caps 40 and 42 are applied.

Each of the assembled sprayer hose assemblies 30 are then assembled into faucet 10 and, more particularly, are fluidly coupled with outlet tube 26 and sprayhead 15 in order to deliver fluid from faucet 10. Additionally, energy wires 38 are assembled with various components of faucet 10 in order to transmit energy (e.g., capacitive energy, electrical current, light, or other forms of energy) in response to a user input.

Although the invention has been described in detail with reference to certain preferred embodiments, variations and modifications exist within the spirit and scope of the invention as described and defined in the following claims.

The invention claimed is:

1. A sprayer hose for a fluid delivery device including:
   a waterway tube having an outer surface;
   at least one energy wire extending helically around the outer surface of the waterway tube and configured to transmit energy therethrough;
   a covering layer positioned outwardly of the waterway tube and the at least one energy wire;
   a first cap member at a first end of the waterway tube, the first cap member coupling the covering layer to the waterway tube; and
   a second cap member at an opposing second end of the waterway tube, the second cap member coupling the covering layer to the waterway tube;
   wherein the at least one energy wire is spaced apart from the first cap member and the second cap member.

2. The sprayer hose of claim 1, wherein the covering layer is an interwoven layer.

3. The sprayer hose of claim 1, wherein a length of the at least one energy wire is greater than a length of the waterway tube.

4. The sprayer hose of claim 1, wherein one helical revolution of the at least one energy wire extends along approximately 2.0-4.0 inches of the waterway tube.

5. The sprayer hose of claim 4, wherein the one helical revolution of the at least one energy wire extends along approximately 3.0 inches of the waterway tube.

6. The sprayer hose of claim 1, wherein the at least one energy wire comprises a capacitive wire.

7. The sprayer hose of claim 1, wherein the at least one energy wire comprises at least three energy wires.

8. The sprayer hose of claim 1, wherein the waterway tube is formed of a polymer.

9. The sprayer hose of claim 8, wherein the waterway tube is formed of a cross-linked polyethylene.

10. The sprayer hose of claim 8, wherein the at least one energy wire includes an electrical wire configured to transmit electrical signals.

11. The sprayer hose of claim 8, wherein the at least one energy wire includes an optical fiber configured to transmit light.

12. The sprayer hose of claim 1, wherein the first cap member is overmolded around the first end of the waterway tube, and the second cap member is overmolded around the second end of the waterway tube.

13. A sprayer hose in combination with a sprayhead of a faucet comprising:
- a waterway tube extending between a first end and a second end, the waterway tube having an outer surface;
- at least one energy wire extending helically around the outer surface of the waterway tube and configured to transmit energy therethrough;
- a covering layer positioned outwardly of the waterway tube and the at least one energy wire;
- a sprayhead fluidly coupled to the second end of the waterway tube; and
- a spout receiving the waterway tube, the sprayhead removably coupled to the spout.

14. The sprayer hose of claim 13, wherein the covering layer is an interwoven layer.

15. The sprayer hose of claim 13, wherein a length of the at least one energy wire is greater than a length of the waterway tube.

16. The sprayer hose of claim 13, wherein one helical revolution of the at least one energy wire extends along approximately 2.0-4.0 inches of the waterway tube.

17. The sprayer hose of claim 13, wherein the at least one energy wire comprises a capacitive wire.

18. The sprayer hose of claim 13, further comprises a first cap member at a first end of the waterway tube and a second cap member at an opposing second end of the waterway tube, and the at least one energy wire is spaced apart from the first and second cap members.

19. The sprayer hose of claim 18, wherein the first cap member and the second cap member couple the covering layer to the waterway tube.

20. The sprayer hose of claim 19, wherein the first cap member is overmolded around the first end of the waterway tube, and the second cap member is overmolded around the second end of the waterway tube.

* * * * *